(12) United States Patent
Marchand et al.

(10) Patent No.: US 12,595,197 B2
(45) Date of Patent: Apr. 7, 2026

(54) CONTAINER, CARTRIDGE, KIT AND METHOD FOR SLOW RELEASE OF ALGAECIDE IN SWIMMING POOLS

(71) Applicant: SANI-MARC INC., Victoriaville (CA)

(72) Inventors: Patrick Marchand, Victoriaville (CA); Victoria Ling, Warwick (CA)

(73) Assignee: SANI-MARC INC., Victoriaville (CA)

( * ) Notice: Subject to any disclaimer, the term of this patent is extended or adjusted under 35 U.S.C. 154(b) by 0 days.

(21) Appl. No.: 17/491,606

(22) Filed: Oct. 1, 2021

(65) Prior Publication Data

US 2022/0259083 A1 Aug. 18, 2022

Related U.S. Application Data

(60) Provisional application No. 63/149,759, filed on Feb. 16, 2021.

(51) Int. Cl.
  *C02F 1/68* (2023.01)
  *C02F 103/42* (2006.01)
  *E04H 4/12* (2006.01)

(52) U.S. Cl.
  CPC .............. *C02F 1/688* (2013.01); *C02F 1/686* (2013.01); *C02F 2103/42* (2013.01); *C02F 2201/006* (2013.01); *E04H 4/1281* (2013.01)

(58) Field of Classification Search
  CPC .. C02F 1/68; C02F 1/688; C02F 1/685; C02F 1/686; C02F 1/687; C02F 2103/42;
  (Continued)

(56) References Cited

U.S. PATENT DOCUMENTS 429,384 A * 6/1890 Manwaring ............... C02F 1/42
  206/0.5
991,825 A * 5/1911 Bogie ..................... E03D 9/038
  210/198.1
(Continued)

FOREIGN PATENT DOCUMENTS

CA 2577954 A1 8/2005
EP 0555600 A1 8/1993

OTHER PUBLICATIONS

European Search Report for European Patent Application No. EP 21200399.0 mailed Mar. 4, 2022, 8 pages.

*Primary Examiner* — Robert J Popovics
(74) *Attorney, Agent, or Firm* — Heslin Rothenberg Farley & Mesiti P.C.

(57) ABSTRACT
Described is a container, a cartridge, a kit and method for slow release of algaecide in swimming pools. The container includes—a hollow housing having a top portion with an internal cavity defining a sub-hollow space within the housing; an open bottom portion for filling the housing with the algaecide; and a lid for closing the open bottom portion of the housing. The cartridge includes a container having a top portion having an internal cavity defining a sub-hollow space within the housing, that sub-hollow space having a dissolving powderous compound. The cartridge further includes a dissolving algaecide composition cast inside the housing and covering the dissolving powderous compound. Described also is a method for the slow release of algaecide, and kits including the cartridge. Slow release of algaecide during an extended period with the cartridge is helpful in the maintenance of swimming pools, particularly during the wintering period.

12 Claims, 5 Drawing Sheets

(58) Field of Classification Search
CPC ... C02F 2201/006; E04H 4/12; E04H 4/1281;
B01F 1/0027
See application file for complete search history.

(56) References Cited

U.S. PATENT DOCUMENTS

| | | | | |
|---|---|---|---|---|
| 1,803,860 | A * | 5/1931 | Marks | E03D 9/038 |
| | | | | 4/227.1 |
| 2,826,484 | A * | 3/1958 | Buehler | B01F 21/22 |
| | | | | 206/0.5 |
| 2,976,129 | A * | 3/1961 | Buehler | C02F 1/688 |
| | | | | 206/0.5 |
| 3,130,124 | A | 4/1964 | Ferris et al. | |
| 3,342,674 | A * | 9/1967 | Kowalski | C02F 1/76 |
| | | | | 210/755 |
| 3,423,182 | A * | 1/1969 | Klasky | E03D 9/038 |
| | | | | 222/424.5 |
| 3,598,536 | A * | 8/1971 | Christensen | B01F 21/22 |
| | | | | 4/488 |
| 3,607,103 | A * | 9/1971 | Kiefer | C02F 1/688 |
| | | | | 206/0.5 |
| D223,337 | S * | 4/1972 | Kuchar | D18/43 |
| D224,401 | S * | 7/1972 | Clinton | D23/207 |
| 3,677,711 | A * | 7/1972 | Bond | C02F 1/688 |
| | | | | 239/57 |
| 3,792,979 | A * | 2/1974 | Clinton | B01F 21/22 |
| | | | | 206/0.5 |
| 3,837,017 | A * | 9/1974 | McDuffee | E03D 9/038 |
| | | | | 4/DIG. 10 |
| 3,851,648 | A * | 12/1974 | Brooke | A61K 9/2072 |
| | | | | 239/57 |
| 3,924,622 | A * | 12/1975 | Brooke | A61K 9/0004 |
| | | | | 239/57 |
| 4,181,702 | A * | 1/1980 | Watson | C02F 1/76 |
| | | | | 210/167.11 |
| 4,217,331 | A * | 8/1980 | Schaub | B01D 11/00 |
| | | | | D23/207 |
| 4,241,025 | A * | 12/1980 | Grayson, IV | C02F 1/688 |
| | | | | 422/264 |
| 4,318,891 | A * | 3/1982 | Kim | C02F 1/688 |
| | | | | 4/227.7 |
| 4,350,666 | A * | 9/1982 | Klutts | B01F 21/22 |
| | | | | 4/DIG. 10 |
| 4,365,362 | A * | 12/1982 | Corey | E03D 9/038 |
| | | | | 4/227.1 |
| 4,374,563 | A * | 2/1983 | Alexander | B65D 71/10 |
| | | | | 206/0.5 |
| 4,389,311 | A * | 6/1983 | La Freniere | C02F 1/50 |
| | | | | 206/217 |
| D269,801 | S * | 7/1983 | Sangster | D23/207 |
| D269,802 | S * | 7/1983 | Alexander | D23/207 |
| 4,416,854 | A * | 11/1983 | Nielsen | C02F 1/46176 |
| | | | | 210/764 |
| 4,435,858 | A * | 3/1984 | Dolan | E03D 9/038 |
| | | | | 4/227.6 |
| 4,473,533 | A * | 9/1984 | Davey | B01F 21/22 |
| | | | | D23/207 |
| 4,534,070 | A * | 8/1985 | Hauptmann | E03D 9/038 |
| | | | | 222/23 |
| 4,546,503 | A * | 10/1985 | Casberg | C02F 1/688 |
| | | | | 422/279 |
| 4,606,893 | A * | 8/1986 | Sangster | B01F 21/22 |
| | | | | 222/23 |
| 4,630,634 | A * | 12/1986 | Sasaki | C02F 1/688 |
| | | | | D23/207 |
| D288,227 | S * | 2/1987 | Robinson | D23/207 |
| 4,643,881 | A * | 2/1987 | Alexander | C02F 1/688 |
| | | | | 222/548 |
| 4,670,149 | A * | 6/1987 | Francis | B01D 17/04 |
| | | | | 210/615 |
| 4,702,270 | A * | 10/1987 | King, Sr. | B01F 33/25 |
| | | | | 137/268 |
| 4,722,460 | A * | 2/1988 | Madsen | C02F 1/50 |
| | | | | 222/174 |
| 4,763,685 | A * | 8/1988 | King, Sr. | B01F 21/22 |
| | | | | 137/268 |
| D297,857 | S * | 9/1988 | Alexander | D23/207 |
| 4,798,707 | A * | 1/1989 | Thomas | C02F 1/688 |
| | | | | 222/169 |
| 4,810,385 | A * | 3/1989 | Hater | C02F 3/348 |
| | | | | 210/615 |
| 4,822,571 | A * | 4/1989 | Nicholson | C02F 1/688 |
| | | | | 422/279 |
| 4,825,528 | A * | 5/1989 | Nicholson | C02F 1/688 |
| | | | | 29/463 |
| 4,828,803 | A * | 5/1989 | Nicholson | C02F 1/688 |
| | | | | 422/279 |
| 4,828,804 | A * | 5/1989 | Nicholson | B01F 21/22 |
| | | | | 441/24 |
| 4,828,805 | A * | 5/1989 | Connors | B01F 21/22 |
| | | | | 206/217 |
| 4,876,003 | A * | 10/1989 | Casberg | B01F 21/00 |
| | | | | 206/5 |
| 4,880,547 | A * | 11/1989 | Etani | C02F 1/688 |
| | | | | 210/764 |
| 4,917,868 | A | 4/1990 | Alexander et al. | |
| 4,928,813 | A * | 5/1990 | Casberg | C02F 1/688 |
| | | | | 53/442 |
| D309,493 | S * | 7/1990 | Casberg | D23/208 |
| 5,053,205 | A * | 10/1991 | Taylor | C02F 1/688 |
| | | | | 210/205 |
| 5,055,183 | A * | 10/1991 | Buchan | C02F 1/688 |
| | | | | 210/85 |
| 5,059,316 | A * | 10/1991 | Renton | B01F 21/22 |
| | | | | 210/242.1 |
| 5,064,624 | A * | 11/1991 | King | E04H 4/1281 |
| | | | | 239/57 |
| 5,124,032 | A * | 6/1992 | Newhard | C02F 1/688 |
| | | | | 210/206 |
| 5,181,281 | A * | 1/1993 | Jang | E03D 9/038 |
| | | | | 4/227.3 |
| 5,350,509 | A * | 9/1994 | Nelson | E04H 4/1281 |
| | | | | 210/232 |
| 5,389,345 | A * | 2/1995 | Renton | C02F 1/688 |
| | | | | 422/275 |
| 5,407,567 | A * | 4/1995 | Newhard | B01F 21/221 |
| | | | | 210/205 |
| 5,433,867 | A * | 7/1995 | Kisner | C02F 1/688 |
| | | | | 210/167.11 |
| 5,476,116 | A * | 12/1995 | Price | E04H 4/1281 |
| | | | | 422/279 |
| D371,824 | S * | 7/1996 | Price | D23/207 |
| 5,662,795 | A * | 9/1997 | Pickens | B01F 21/22 |
| | | | | 137/268 |
| 5,879,932 | A * | 3/1999 | Van Erdewyk | C12M 23/38 |
| | | | | 435/307.1 |
| D412,198 | S * | 7/1999 | Bonelli | D23/208 |
| 6,207,048 | B1 * | 3/2001 | Bonelli | C02F 1/685 |
| | | | | 210/252 |
| 6,221,244 | B1 * | 4/2001 | Yassin | E04H 4/1281 |
| | | | | 210/205 |
| 6,238,553 | B1 * | 5/2001 | Lin | B01F 21/22 |
| | | | | 210/85 |
| 6,309,538 | B1 * | 10/2001 | Khan | G01N 33/1886 |
| | | | | 210/85 |
| 6,340,431 | B2 * | 1/2002 | Khan | G01N 33/1886 |
| | | | | 210/85 |
| 6,432,371 | B1 * | 8/2002 | Oliver, Jr. | C02F 1/76 |
| | | | | 210/242.1 |
| 6,500,334 | B1 * | 12/2002 | King | B01F 25/312 |
| | | | | 422/243 |
| 6,562,242 | B2 * | 5/2003 | King | B01F 25/316 |
| | | | | 210/764 |
| 6,641,787 | B1 * | 11/2003 | Siggins | E04H 4/1281 |
| | | | | 210/242.1 |
| D486,881 | S * | 2/2004 | Pecci | D23/207 |
| 6,685,827 | B2 * | 2/2004 | King | B01F 25/316 |
| | | | | 210/220 |

(56) References Cited

U.S. PATENT DOCUMENTS

| | | | | | |
|---|---|---|---|---|---|
| 6,730,509 | B2 * | 5/2004 | VanErdewyk | C12M 23/20 | 435/297.1 |
| 6,855,300 | B2 * | 2/2005 | Cormier | C02F 1/688 | 441/24 |
| D506,804 | S * | 6/2005 | Maloney | D23/208 | |
| 6,901,609 | B2 * | 6/2005 | Hill | A61L 9/12 | 422/264 |
| 6,908,551 | B2 * | 6/2005 | King | B01F 25/316 | 210/205 |
| 6,915,811 | B2 * | 7/2005 | Blanchette | E04H 4/1281 | 422/264 |
| 6,944,889 | B2 * | 9/2005 | Hill | A61L 9/04 | 422/264 |
| D510,404 | S * | 10/2005 | Thompson | D23/207 | |
| D512,481 | S * | 12/2005 | Thompson | D23/208 | |
| D517,643 | S * | 3/2006 | Thompson | D23/208 | |
| D518,142 | S * | 3/2006 | Thompson | D23/208 | |
| 7,014,780 | B2 * | 3/2006 | King | B01F 25/312 | 210/205 |
| 7,020,591 | B1 | 3/2006 | Wei et al. | | |
| D518,554 | S * | 4/2006 | Thompson | D23/208 | |
| D518,870 | S * | 4/2006 | Thompson | D23/208 | |
| 7,059,540 | B2 * | 6/2006 | King | B01F 21/22 | 239/34 |
| 7,060,190 | B2 * | 6/2006 | King | C02F 1/688 | 210/764 |
| D526,043 | S * | 8/2006 | Thompson | D23/208 | |
| D526,382 | S * | 8/2006 | Thompson | D23/208 | |
| D528,929 | S * | 9/2006 | Oliver, Jr. | D10/57 | |
| D559,943 | S * | 1/2008 | Mercer | D23/207 | |
| 7,487,790 | B2 * | 2/2009 | King | E04H 4/1281 | 137/268 |
| 7,510,651 | B1 * | 3/2009 | Auger | C02F 1/688 | 210/242.1 |
| D592,273 | S * | 5/2009 | Eisch | D23/207 | |
| 7,704,467 | B2 * | 4/2010 | Hodgetts | C02F 1/688 | 137/268 |
| 7,922,982 | B1 * | 4/2011 | Brennan | B01F 21/22 | 210/242.1 |
| D652,374 | S * | 1/2012 | Mercer | D13/102 | |
| 8,728,406 | B2 * | 5/2014 | Van Der Meijden | B01F 21/221 | 210/242.1 |
| 8,999,259 | B2 * | 4/2015 | King | B01F 33/503 | 210/167.3 |
| 9,174,177 | B2 * | 11/2015 | King, Jr. | C02F 1/76 | |
| D745,947 | S * | 12/2015 | Finley | D23/208 | |
| D747,439 | S * | 1/2016 | Byers | D23/208 | |
| 9,227,164 | B2 * | 1/2016 | Sherman | B01F 21/15 | |
| D757,211 | S * | 5/2016 | Slocum | D11/160 | |
| 9,389,337 | B1 * | 7/2016 | Wang | B05C 13/02 | |
| 9,815,719 | B2 * | 11/2017 | Sayre | C02F 1/688 | |
| 9,862,626 | B2 * | 1/2018 | King | E04H 4/1281 | |
| 9,975,792 | B2 * | 5/2018 | Thorgersen | C02F 1/688 | |
| 10,017,402 | B2 * | 7/2018 | King | C02F 1/76 | |
| 10,029,931 | B2 * | 7/2018 | King | C02F 1/688 | |
| 10,029,932 | B2 * | 7/2018 | King | B01F 21/22 | |
| D826,373 | S * | 8/2018 | Kisner | D23/208 | |
| 10,047,535 | B2 * | 8/2018 | King | B01F 21/22 | |
| 10,066,382 | B2 * | 9/2018 | Muderlak | E03D 13/007 | |
| 10,094,129 | B2 * | 10/2018 | He | C02F 1/688 | |
| 10,118,847 | B2 * | 11/2018 | Howe | C02F 3/305 | |
| 10,119,287 | B2 * | 11/2018 | King | C02F 1/688 | |
| 10,337,200 | B2 * | 7/2019 | King | E04H 4/1281 | |
| 10,472,264 | B2 * | 11/2019 | Simonsen | B01F 33/503 | |
| D882,727 | S * | 4/2020 | Lee | D23/207 | |
| 10,626,591 | B2 * | 4/2020 | Muderlak | E03D 9/03 | |
| 10,710,912 | B1 * | 7/2020 | Gomez | C02F 1/688 | |
| 10,717,055 | B2 * | 7/2020 | Huang | B01J 4/001 | |
| 10,982,425 | B1 * | 4/2021 | Grumbach | E03F 5/041 | |
| 11,008,235 | B2 * | 5/2021 | King | B01F 33/503 | |
| 11,124,436 | B2 * | 9/2021 | King | C02F 1/688 | |
| 11,186,501 | B2 * | 11/2021 | Lopez De Cardenas | B65D 83/0005 | |
| 11,242,678 | B2 * | 2/2022 | Grumbach | C02F 3/342 | |
| 11,408,191 | B2 * | 8/2022 | King | C02F 1/688 | |
| 11,447,406 | B2 * | 9/2022 | King | B01F 21/22 | |
| D967,328 | S * | 10/2022 | Speak | D23/208 | |
| D968,970 | S * | 11/2022 | Oh | D10/46 | |
| D969,269 | S * | 11/2022 | Tran | D23/208 | |
| 11,492,276 | B2 * | 11/2022 | King | B01F 21/22 | |
| D980,381 | S * | 3/2023 | Pike | D23/207 | |
| D1,001,235 | S * | 10/2023 | Foglia | D23/207 | |
| 11,788,312 | B2 * | 10/2023 | Shalon | C02F 1/685 | 210/85 |
| 11,946,279 | B2 * | 4/2024 | Afshar | B01D 37/025 | |
| 12,049,768 | B2 * | 7/2024 | Gong | E04H 4/14 | |
| 12,054,962 | B2 * | 8/2024 | Guy | B01D 29/27 | |
| 12,060,287 | B2 * | 8/2024 | King | C02F 1/688 | |
| 12,181,348 | B1 * | 12/2024 | Li | G01K 1/14 | |
| 12,234,166 | B2 * | 2/2025 | Barton | C02F 1/688 | |
| 12,384,703 | B2 * | 8/2025 | Gong | G01K 13/00 | |
| 12,404,689 | B2 * | 9/2025 | King | C02F 1/688 | |
| 2002/0020676 | A1 * | 2/2002 | King | B01F 25/312 | 210/753 |
| 2002/0100733 | A1 * | 8/2002 | King | B01F 21/22 | 210/753 |
| 2004/0069698 | A1 * | 4/2004 | King | B01F 25/312 | 210/205 |
| 2004/0144699 | A1 * | 7/2004 | Lin | G05D 21/02 | 210/85 |
| 2004/0168963 | A1 * | 9/2004 | King | B01F 21/22 | 210/198.1 |
| 2004/0175311 | A1 * | 9/2004 | Cormier | A61L 2/23 | 422/40 |
| 2005/0063858 | A1 * | 3/2005 | Cormier | A61L 2/23 | 422/265 |
| 2005/0077374 | A1 * | 4/2005 | King | B01F 21/22 | 239/42 |
| 2005/0126977 | A1 * | 6/2005 | Carter | C02F 1/285 | 210/242.4 |
| 2005/0163684 | A1 * | 7/2005 | Sherr | B01F 21/22 | 422/265 |
| 2005/0211613 | A1 * | 9/2005 | King | E04H 4/1272 | 210/167.11 |
| 2005/0242016 | A1 * | 11/2005 | King | B01F 25/316 | 210/198.1 |
| 2006/0254968 | A1 * | 11/2006 | King | C02F 1/688 | 210/198.1 |
| 2007/0020300 | A1 * | 1/2007 | Hubig | C02F 7/00 | 424/400 |
| 2007/0039859 | A1 * | 2/2007 | King | E04H 4/1636 | 210/97 |
| 2007/0119761 | A1 * | 5/2007 | King | E04H 4/1281 | 210/198.1 |
| 2007/0272622 | A1 * | 11/2007 | Mercer | C02F 1/76 | 210/754 |
| 2008/0217258 | A1 * | 9/2008 | Buchan | B01F 21/22 | 210/167.11 |
| 2009/0028965 | A1 * | 1/2009 | Healey | A61K 31/40 | 424/661 |
| 2010/0196228 | A1 * | 8/2010 | Efird | E04H 4/1281 | 422/265 |
| 2011/0089121 | A1 * | 4/2011 | Van Der Meijden | B01F 21/221 | 222/130 |
| 2011/0132848 | A1 * | 6/2011 | Diaz | B01F 21/22 | 210/764 |
| 2013/0092634 | A1 * | 4/2013 | King | C02F 1/766 | 210/749 |
| 2013/0092635 | A1 * | 4/2013 | King | E04H 4/1209 | 210/749 |
| 2014/0027358 | A1 * | 1/2014 | Sayre | C02F 1/688 | 424/641 |
| 2014/0056838 | A1 * | 2/2014 | Sayre | A61K 8/817 | 424/78.02 |
| 2014/0110352 | A1 * | 4/2014 | King | C02F 1/505 | 222/173 |

(56) References Cited

U.S. PATENT DOCUMENTS

| | | | | |
|---|---|---|---|---|
| 2014/0124456 A1* | 5/2014 | King | C02F 1/766 | 210/764 |
| 2014/0170036 A1* | 6/2014 | Sherman | B01F 21/15 | 422/256 |
| 2014/0175022 A1* | 6/2014 | King | B01F 21/22 | 210/749 |
| 2014/0205512 A1* | 7/2014 | King | E04H 4/1281 | 422/265 |
| 2015/0152662 A1* | 6/2015 | King | C02F 1/76 | 422/265 |
| 2015/0152663 A1* | 6/2015 | King | C02F 1/766 | 210/747.1 |
| 2015/0240510 A1* | 8/2015 | King | E04H 4/1281 | 210/85 |
| 2015/0322683 A1* | 11/2015 | Edwards | E04H 4/1281 | 210/86 |
| 2015/0368128 A1* | 12/2015 | King | C02F 1/76 | 422/119 |
| 2017/0356209 A1* | 12/2017 | He | C02F 1/688 | |
| 2018/0029906 A1* | 2/2018 | King | C02F 1/766 | |
| 2018/0209160 A1* | 7/2018 | King | C02F 1/76 | |
| 2018/0229919 A1* | 8/2018 | King | C02F 1/688 | |
| 2018/0327291 A1* | 11/2018 | Simonsen | B01F 33/503 | |
| 2018/0328015 A1* | 11/2018 | Muderlak | E03C 1/264 | |
| 2019/0022603 A1* | 1/2019 | Huang | C02F 1/688 | |
| 2019/0257102 A1* | 8/2019 | King | C02F 1/688 | |
| 2019/0322557 A1* | 10/2019 | King | C02F 1/76 | |
| 2020/0399153 A9* | 12/2020 | King | E04H 4/1281 | |
| 2021/0071436 A1* | 3/2021 | King | E04H 4/1281 | |
| 2021/0172188 A1* | 6/2021 | Afshar | E04H 4/1281 | |
| 2021/0198130 A1* | 7/2021 | King | C02F 1/76 | |
| 2021/0207356 A1* | 7/2021 | Grumbach | E03F 5/0408 | |
| 2021/0340786 A1* | 11/2021 | Zhang | G01K 1/14 | |
| 2022/0186485 A1* | 6/2022 | Grumbach | E03F 5/0408 | |
| 2022/0259083 A1* | 8/2022 | Marchand | C02F 1/50 | |
| 2022/0282509 A1* | 9/2022 | Guy | E04H 4/1272 | |
| 2022/0315458 A1* | 10/2022 | Buchan | C02F 1/50 | |
| 2022/0332613 A1* | 10/2022 | Feniger | C02F 1/688 | |
| 2022/0412113 A1* | 12/2022 | Zhang | C02F 1/687 | |
| 2023/0101118 A1* | 3/2023 | Rowhani | C02F 1/76 | 210/198.1 |
| 2023/0192523 A1* | 6/2023 | Domjancic | A01K 63/045 | 210/167.16 |
| 2023/0242425 A1* | 8/2023 | Rowhani | C02F 1/76 | 210/764 |
| 2023/0250660 A1* | 8/2023 | L'Hoest | C02F 1/76 | 137/268 |
| 2023/0348301 A1* | 11/2023 | Guy | C02F 1/685 | |
| 2023/0357060 A1* | 11/2023 | Barton | C02F 1/68 | |
| 2023/0391646 A1* | 12/2023 | Cymbalski | C02F 1/688 | |
| 2024/0141666 A1* | 5/2024 | Gong | F21V 33/00 | |
| 2024/0175280 A1* | 5/2024 | Barton | E04H 4/1245 | |
| 2024/0262722 A1* | 8/2024 | Stevens | C02F 1/001 | |
| 2024/0270616 A1* | 8/2024 | Dillow | C02F 1/688 | |
| 2024/0368011 A1* | 11/2024 | Rowhani | C02F 1/688 | |
| 2024/0392594 A1* | 11/2024 | Guy | E04H 4/1281 | |
| 2024/0410193 A1* | 12/2024 | Pugh | E04H 4/1281 | |
| 2025/0034003 A1* | 1/2025 | Cueman | B01J 41/07 | |
| 2025/0161887 A1* | 5/2025 | L'Hoest | E04H 4/1209 | |
| 2025/0171336 A1* | 5/2025 | Gong | G01K 1/14 | |
| 2025/0237076 A1* | 7/2025 | Guy | E04H 4/1272 | |
| 2025/0243092 A1* | 7/2025 | Wan | F21V 33/0004 | |
| 2025/0304469 A1* | 10/2025 | Winslow | C02F 1/008 | |
| 2025/0388500 A1* | 12/2025 | Munford | C02F 1/686 | |

* cited by examiner

1

CONTAINER, CARTRIDGE, KIT AND METHOD FOR SLOW RELEASE OF ALGAECIDE IN SWIMMING POOLS

CROSS REFERENCE TO RELATED APPLICATION

This application claims priority to U.S. provisional patent application U.S. 63/149,759 filed on Feb. 16, 2021, the content of which is incorporated herein in its entirety.

FIELD OF THE INVENTION

The invention relates to the field of maintenance of swimming pools, and more particularly to a slow release of algaecide during an extended period.

BACKGROUND OF THE INVENTION

Proper maintenance of swimming pools requires the presence of a minimum amount of algaecide to avoid proliferation of algae. However water treatment of swimming pools may be complicated during a prolong absence of the owner since the owner cannot then add the required chemicals to the pool. Winter is also a challenge for the maintenance of the pool because the pool is covered by a protective tarp and/or by ice. Floating devices are not very useful for the winter period since they become stuck into the ice when the water freezes.

There is thus a need for methods and products allowing to control proliferation of algae on a continuous basis, even without continuous supervision.

There is also a need for the slow release of chemicals, particularly algaecide, into the pool during winter and/or when the owner is absent.

There is also a need for a container that will not be prevented from releasing its content during the winter because it has been captured into the ice.

There is also a need for a container filled with pool chemicals that could be dropped into the bottom of the pool and recovered at the surface when empty.

The present invention addresses these needs and other needs as it will be apparent from the review of the disclosure and description of the features of the invention hereinafter.

BRIEF SUMMARY OF THE INVENTION

According to one aspect, the invention relates to a container for slowly releasing an algaecide in a swimming pool, comprising:
- a hollow housing for receiving the algaecide, the hollow housing comprising:
  - a top portion comprising an internal cavity defining a sub-hollow space within the housing; and
  - an open bottom portion for filling the housing with the algaecide; and
- a lid for closing the open bottom portion of the housing.

According to another aspect, the invention relates to a cartridge for the slow release of algaecide in swimming pools, comprising:
- a container, comprising:
  - a housing for receiving the algaecide and a dissolving powderous compound,
  - the housing comprising:
    - a top portion comprising an internal cavity defining a sub-hollow space within the housing, wherein said sub-hollow space comprises at least a portion of said dissolving powderous compound,
- a solid or semi-solid dissolving algaecide composition cast inside the housing and covering said dissolving powderous compound,
- an open closable bottom portion for introducing the powderous compound and the algaecide inside the housing, and
- a lid for covering the open bottom of the housing.

In particular embodiments, the lid is detachably connected to the bottom portion of the container. In particular embodiments, the lid comprises at least one opening for allowing a flow of liquid inside the container.

According to one particular aspect, the invention relates to a cartridge for the slow release of algaecide in swimming pools, comprising:
- a container, comprising:
  - a housing for receiving the algaecide and a dissolving powderous compound,
  - the housing comprising:
    - a top portion comprising an internal cavity defining a sub-hollow space within the housing, wherein said sub-hollow space comprises at least a portion of said dissolving powderous compound,
    - a solid or semi-solid dissolving algaecide composition cast inside the housing and covering said dissolving powderous compound,
    - an open closable bottom portion for introducing the powderous compound and the algaecide inside the housing,
    - wherein the algaecide composition surround and covers said dissolving powderous compound,
  - wherein the dissolving powderous compound comprises a compound selected from the group consisting of salts, clarifiers. pH adjusters, increasers of hardness and mixtures thereof, a lid for covering the open bottom of the housing,
  - wherein said lid comprises at least one opening for allowing a flow of liquid inside the container, and
  - a removable sheet for sealing said at least one opening.

According to another aspect, the invention relates to a method for the slow release of algaecide in a swimming pool, comprising:
- providing a cartridge as defined herein;
- dropping said cartridge into the pool,
  - wherein the cartridge is adapted to sink to the bottom of the pool when comprising said solid or semi-solid dissolving algaecide composition and said dissolving powderous material, and
  - wherein the cartridge floats at the surface of the pool when said solid or semi-solid dissolving algaecide composition and said dissolving powderous material is dissolved into the water.

According to another aspect, the invention relates to a kit for wintering a swimming pool, comprising:
- a. a cartridge as defined herein; and
- b. at least one of the instructions, chlorination granules, chlorination tablets, salt cell protector, stabilizer, neutralizer for ensuring a proper pH balance, water analysis product(s), a bucket, and a measuring cup.

Additional aspects, advantages and features of the present invention will become more apparent upon reading of the following non-restrictive description of preferred embodiments which are exemplary and should not be interpreted as limiting the scope of the invention.

BRIEF DESCRIPTION OF THE DRAWINGS

In order for the invention to be readily understood, embodiments of the invention are illustrated by way of example in the accompanying drawings.

Further details of the invention and its advantages will be apparent from the detailed description included below.

DETAILED DESCRIPTION OF EMBODIMENTS

In the following description of the embodiments, references to the accompanying drawings are illustrations of examples by which the invention may be practiced. It will be understood that other embodiments may be made without departing from the scope of the invention disclosed.

General Overview

The invention provides new means for slowly dissolving chemicals into water and over an extended period. The invention finds particular applications in the maintenance of swimming pools by allowing the slow release of chemicals, such as an algaecide, during period where adding chemicals to the water is not possible like during the winter and/or when the owner of the pool is absent.

In one particular aspect, the invention relates to a cartridge comprising a container that can float, the container being filled with a dissolving powderous compound and a solidified dissolving algaecide, the algaecide covering the powderous compound. When filled with the powderous compound and the algaecide, the container cannot float because it has a density greater than that of water causing the cartridge to sink into the water (e.g., at the bottom of a pool). The container has one or more openings allowing water to flow inside the container. The flow of water slowly dissolves, i.e. during an extended period, primary the algaecide covering the powderous compound and subsequently the powderous compound itself. When enough of the powderous compound has been dissolved, the floating container rises to the surface of the water and can then be discarded by a user.

Container and Cartridge

According to one particular aspect, there is provided a container and a cartridge for the slow release of chemicals in water, particularly the slow release of chemicals at the bottom of swimming pools. In embodiments the chemicals which are released comprise an algaecide and a dissolving powderous compound such as a clarifier.

Figure 3:
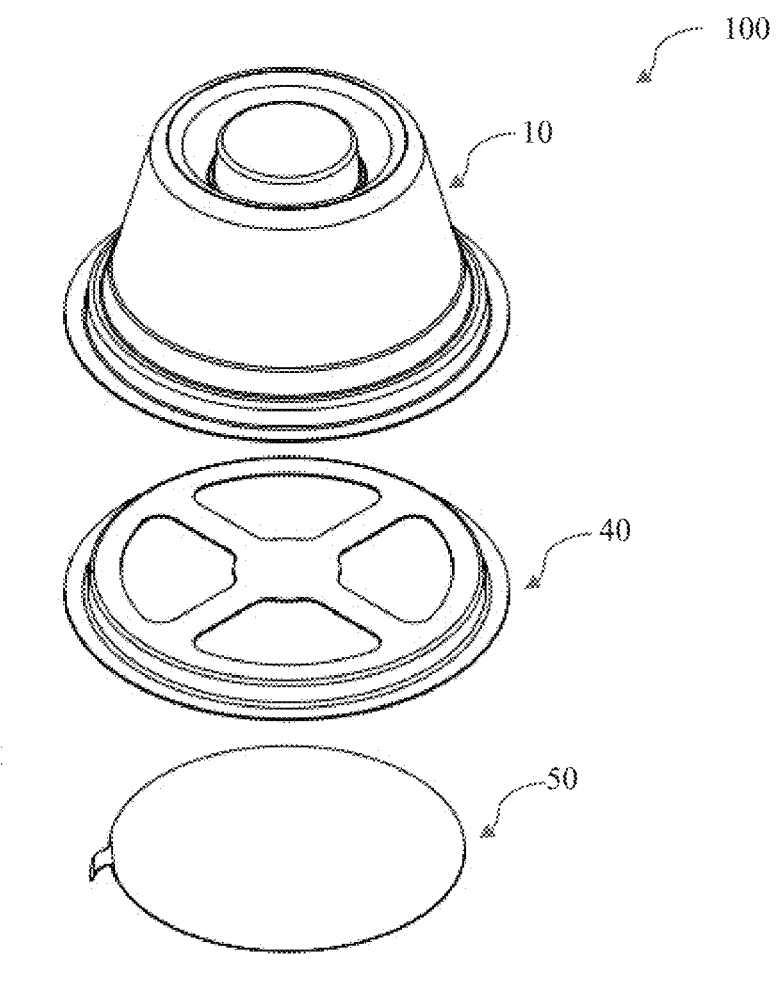
FIG. 3 is a perspective exploded view an empty cartridge comprising a housing, a lid and a label, in accordance with one embodiment of the present invention.
Figure 4:
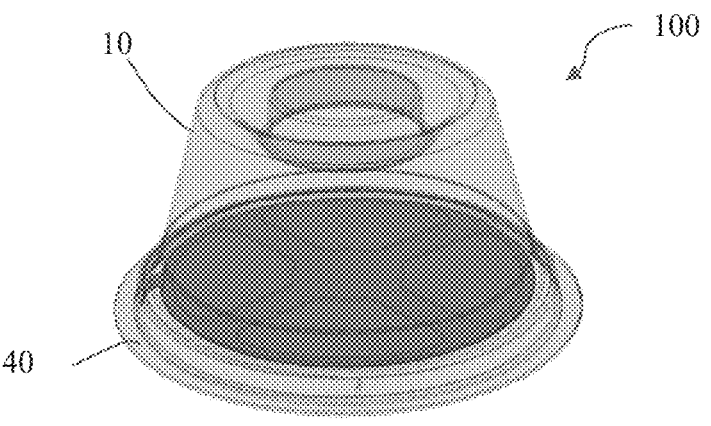
FIG. 4 is a perspective transparent view of the empty cartridge of FIG. 3 in assembled form, in accordance with one embodiment of the present invention.
Figure 5:
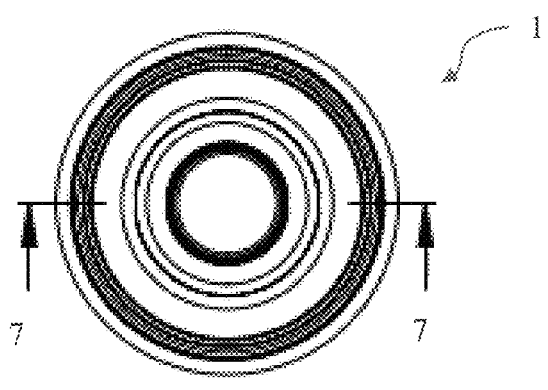
FIG. 5 is a top view of the cartridge of FIGS. 1 to 4, in accordance with one embodiment of the present invention.

Reference is made to FIGS. 1, 2, 5, 6 and 7, which illustrate a cartridge 1 comprising an algaecide 30 and a dissolving powderous compound 20 for slowly releasing algaecide in a swimming pool in accordance with one embodiment of the present invention, and also to FIGS. 3 and 4, which illustrate an empty container 100 configured for receiving and slowly releasing the algaecide 30 and powderous compound 20.

The container 100 comprises a hollow housing 10 for receiving the algaecide 30 and a lid 40. The hollow housing 10 comprises a top portion 12 defining a rim 17 and comprising an internal cavity defining a sub-hollow space 14 within the housing and an open bottom portion 11 for filling the housing with the algaecide 30 and for receiving the lid 40. The lid 40 is configured for closing the open bottom portion 11 of the housing 10. The lid comprises at least one opening 42 for allowing a flow of liquid inside the container 100 (i.e. inside the housing 10 comprising the algaecide and the powderous composition). In embodiments the container 100 further comprises a removable sheet 50 (e.g. a self-adhesive label) for sealing the at least one opening 42 of the lid 40.

The cartridge 1 typically consists of a container 100 that has been filled with 1) the dissolving powderous compounds 20 and 2) the algaecide 30. In the illustrated embodiment, the cartridge 1 comprises a container 100 having a housing 100 for receiving both, the algaecide 30 and the dissolving powderous compound 40. As illustrated, the housing 10 comprises a top portion 12 comprising crater-like shape having a central hollow bump 13 surrounded by a ring-shaped empty space 15, the hollow bump 13 and empty space 15 defining together a sub-hollow space 14 within the top portion 12 of the housing 10. That sub-hollow space 14 is adapted for receiving at least a portion of the dissolving powderous compound 20. The housing 10 also comprises an open closable bottom portion 11 allowing to introduce the powderous compound 20 and the algaecide 30 inside the housing 10. In embodiments, the dissolving algaecide 30 is poured hot into the housing 10 of the cartridge 1, after having deposited primarily the dissolving powderous compound 20 inside the sub-hollow space 14, and let to solidify into the container 1. The container 1 is also provided with a lid 470 for closing the open bottom 11 of the housing 10. Preferably the lid 40 comprises a plurality of openings 42 for a controlled dissolution and release of the dissolving material(s) inside the container. It may also be envisioned to have a removable lid without any opening such that removal of the lid would provide the required opening for dissolution of the container's content.

The number, size and disposition of the opening(s) in the lid 40 may be adjusted in accordance with various factors including, but not limited to, the surface of the lid, the size of the cartridge, the amount of algaecide and/or amount of powderous compound loaded into the cartridge, the nature of dissolving material, the desired speed of dissolution, the expected temperature of the water, the water flow in the pool, etc. Preferably the lid comprises a plurality of openings and these openings are positioned and/or sized for providing a suitable uniform dissolution of the dissolving material inside the container. For instance, the lid 40 may comprise two, three, four, five or more openings. In embodiments, the opening(s) occupies (y) about 5%, or about 8%, or about 10%, or about 15%, or about 20%, about 25%, or about 30%, or about 40%, or about 50%, or about 60% or more of the total surface of the lid. In embodiments, the opening(s) occupies (y) from about 5% to about 50%, or about 10% to about 30% of the total surface of the lid. In embodiments, the opening(s) in the lid amount for at least 3 cm$^2$, or at least 5 cm$^2$, or at least 10 cm$^2$, or at least 15 cm$^2$, or at least 16 cm$^2$, or at least 20 cm$^2$.

Figure 1:
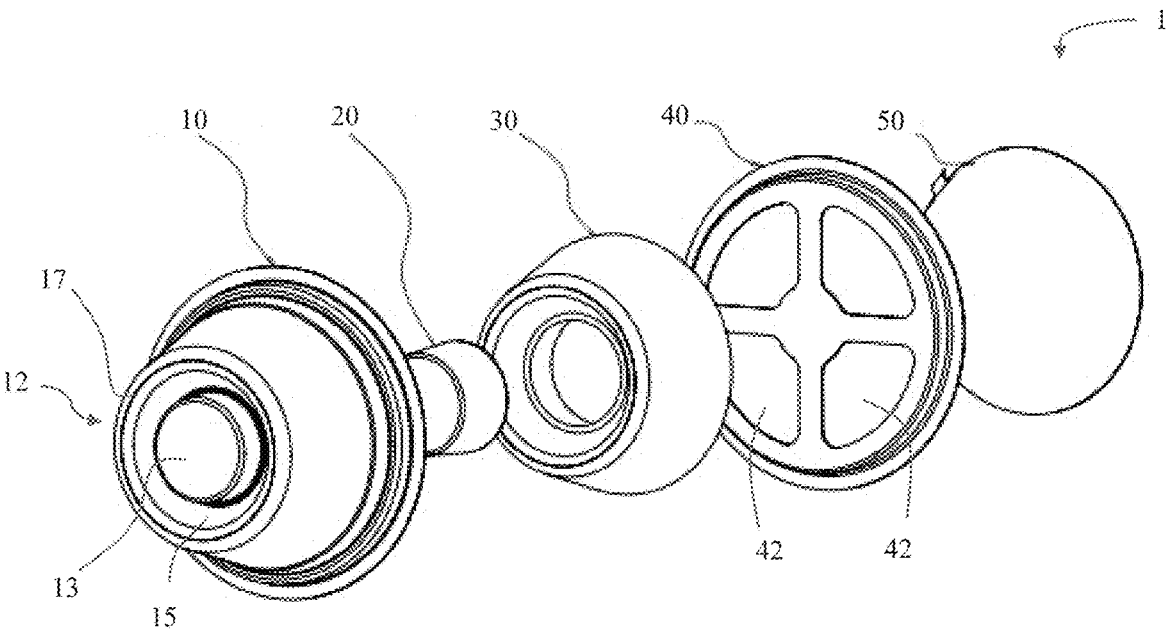
FIG. 1 is a perspective exploded view of a cartridge for the slow release of an algaecide and powderous compound showing, among other things, an exterior of a hollow housing for receiving the algaecide and powderous compound, in accordance with one embodiment of the present invention.
Figure 2:
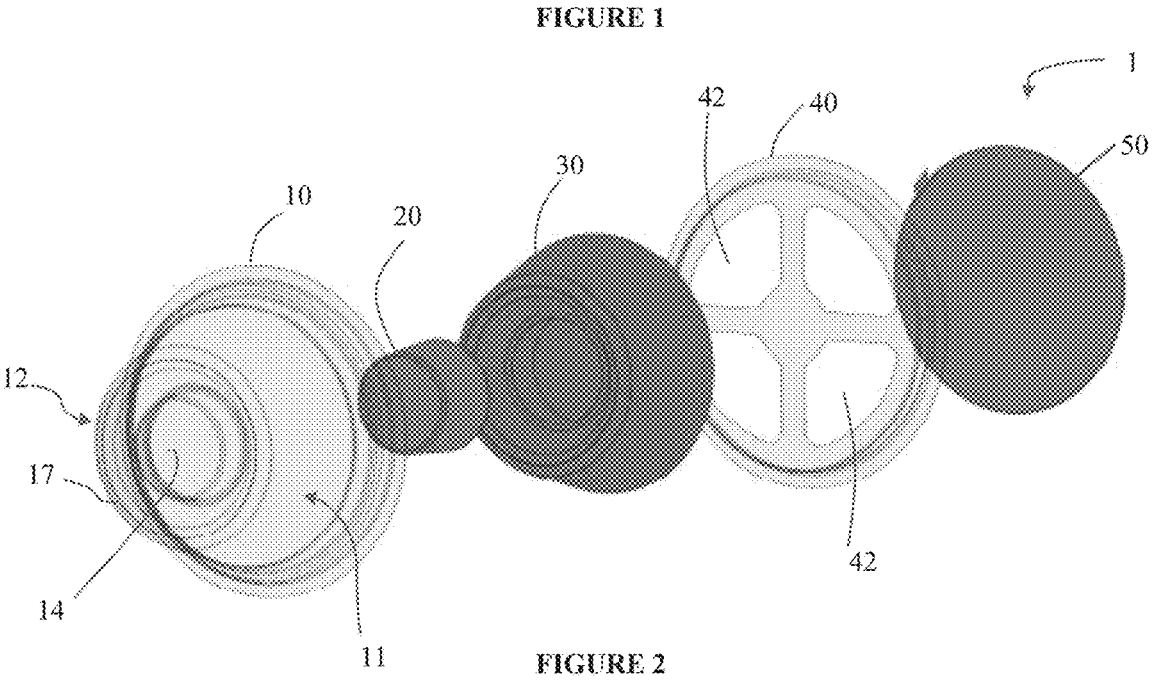
FIG. 2 is a perspective exploded transparent view of the cartridge of FIG. 1 showing, among other things, an interior of the hollow housing.

For instance, in one particular embodiment the container has a bottom diameter of about 10 cm with an opening of about 7.8 cm (i.e. an opening surface of about 48 cm$^2$) and the lid comprises a plurality of openings (e.g. four openings having a pie-shape, each having a surface of 3 cm$^2$ like in the illustrated embodiment of FIG. 1), these openings having a

Figure 6:
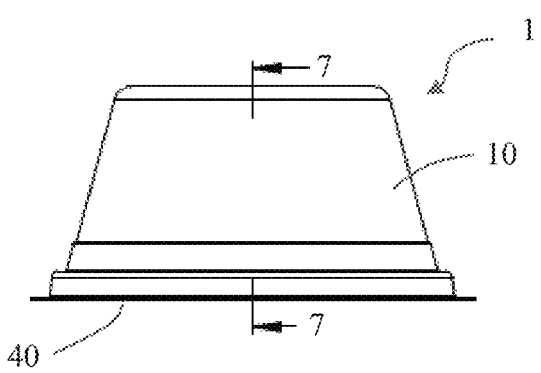
FIG. 6 is a side view of the cartridge of FIG. 5, in accordance with one embodiment of the present invention.
Figure 7:
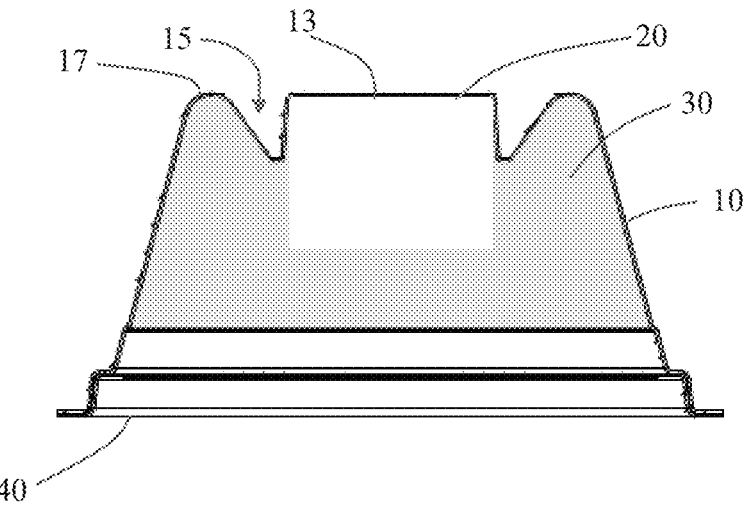
FIG. 7 is a cross-sectional view showing an interior of the cartridge of FIGS. 1 to 6, taken along the lines 7-7 of FIG. 5 and FIG. 6, in accordance with one embodiment of the present invention.

6 portion as show in FIG. 6. Therefore, once the algaecide 30 composition has been cast inside the housing 10, the algaecide covers and surrounds the solid tablet 10 (see FIG. 6).

Figure 8:
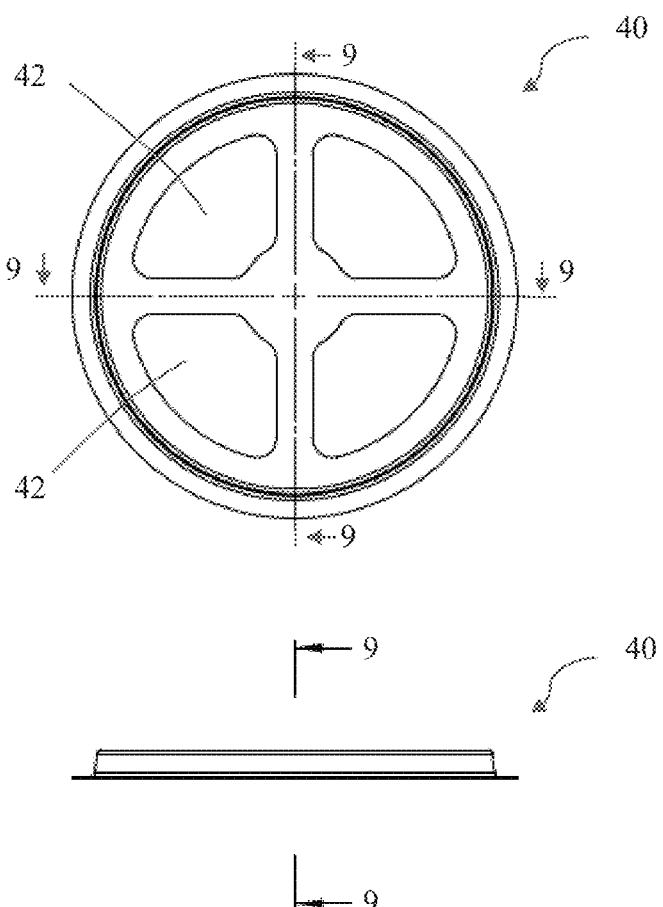
FIG. 8 shows a top (top drawing) and a side view (bottom drawing) of a lid, in accordance with one embodiment of the present invention.
Figure 9:
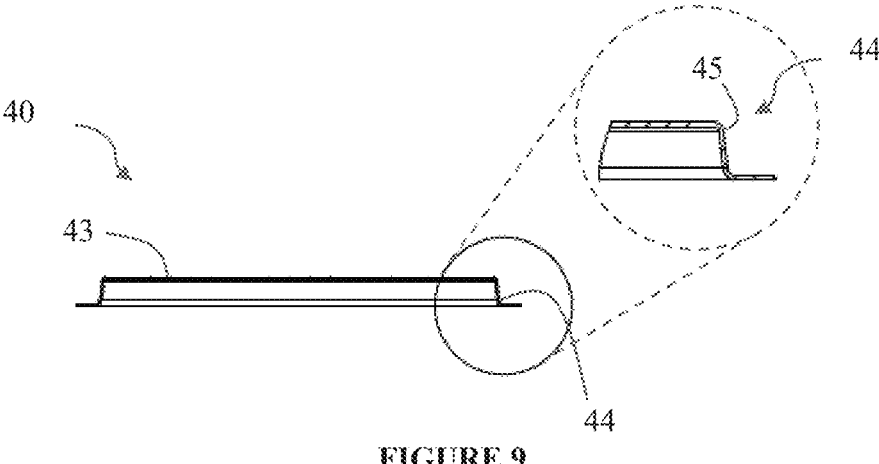
FIG. 9 is a cross-sectional view of the lid, taken along the lines 9-9 of FIG. 8, further showing an enlargement of a peripheral section of the lid, in accordance with one embodiment of the present invention.

In one embodiment, the lid 40 is detachably connected to the bottom portion 11 of the container 100. For instance, as illustrated in FIGS. 8 and 9, the lid 40 may be shaped like a plateau having a flat top portion 42 a peripheral lower portion 44 for surrounding the bottom portion of the housing, and an upper portion 45 adapted to be tightly fit inside the bottom portion of the housing.

The container 100 may further comprise a removable sheet 50 (or other types of closing means) for sealing the opening(s) 42 of the lid 40. In embodiments the removable sheet 50 is a self-adhesive label (e.g. a label that comprises information about the cartridge, its content, its uses, etc. and which can be peeled off). Accordingly in embodiments the lid 40 is rigidly connected (e.g. sealed, glued) to the bottom portion 11 of the container 100 to avoid the lid 40 from coming off when removing the label 50.

Preferably, the container 100 is a floating container, i.e. it has density <1.0 g/cm$^3$ in order to rise and stay at the surface of the water when empty thereby facilitating its pick-up for being discarded or recycled by a user. In embodiments, at least one of the housing 10 and lid 40 is made of plastic. Preferably, the whole container 100 is made of plastics. Example of suitable plastics (floating and non-floating) include, but are not limited to those listed in Table 1 below:

TABLE 1

| Plastics and their density values | | |
| --- | --- | --- |
| Abbreviation | Name | Density |
| LDPE | Low Density Polyethylene | 0.917-0.93 g/cm$^3$ |
| MDPE | Medium Density Polyethylene | 0.926-0.940 g/cm$^3$ |
| HDPE | High Density Polyethylene | 0.93-0.97 g/cm$^3$ |
| PP | Polypropylene | ~0.97 g/cm$^3$ |
| CA | Cellulose Acetate | ~1.2 g/cm$^3$ |
| PETG | Polyethylene Terephthalate Glycol | ~1.27 g/cm$^3$ |
| PET | Polyethylene Terephthalate | ~1.3 g/cm$^3$ |
| PVC | Polyvinyl Chloride | ~1.3 g/cm$^3$ |
| ABS | Acrylonitrile butadiene styrene (ABS) | ~0.9-1.53 g/cm$^3$ |
| HIPS | High-Impact Polystyrene (HIPS) | ~1.03-1.08 g/cm$^3$ |
| | Acrylic | ~1.0511 g/cm$^3$ | size adapted for providing a surface of contact with water of at least 12 cm$^2$ (i.e. about 20% of the total surface). In other embodiments for a similar container (i.e. bottom diameter of 10 cm with an opening of about 7.8 cm), the lid comprises i) larger openings (e.g. four openings each having a surface of 5 cm$^2$ for a total surface of contact with water of 20 cm$^2$), or smaller openings (e.g. four openings each having a surface of 1.5 cm$^2$ for a total surface of contact with water of 6 cm$^2$.

It is within the skills of those skilled in the art to positioned opening(s) in accordance with the need. It can be envisioned to provided openings through the housing of the container, in addition and/or in replacement to the openings in the lid. For instance, the circular wall of the housing could be provided a plurality of side openings and with a removable outer side label to seal this (these) side opening(s). Likewise, openings and a corresponding label could be provided in the top portion of the housing.

In the illustrated embodiment, the powderous compound 20 is a solid tablet having a cylindrical shape which is adapted to be snugly fit into the sub-hollow space 14 of the housing 10. That solid tablet also extends from the sub-hollow space 14 inside the housing 10 toward the bottom In preferred embodiments, the dissolving algaecide 30 is in a solid or semi-solid form in order to provide a slow dissolution and slow release of algaecide over an extended period. Preferably the algaecide is poured hot into the container after deposition of the dissolving powderous compound inside the sub-hollow space, and it is let to solidify into the container. Many suitable algaecide can be used. The algaecide could also be mixed with something else (e.g. salts, clarifiers, pH adjusters, increasers of hardness, water softeners, bicarbonate, etc.), and the term "algaecide" as used herein encompasses such mixtures. Suitable algaecides may comprise a compound selected from quaternary ammonium compounds, polyquaternium compounds, copper salts, zinc salts and mixtures thereof. Typically, such solid or semi-solid algaecides have a density lower than that of water, for instance about 0.9 g/cm$^3$.

Therefore, the dissolving powderous compound has preferably two roles: 1) to add density to the overall cartridge such that it can sink in water and, preferably 2) to play a useful role as chemical for water treatment, in addition to the algaecide. Therefore, the amount and selection of the powderous compound may be selected according to a desired use, and also according to the density of the container (i.e.

<1.0 g/cm³ when empty for buoyancy for a floating container) and the algaecide (e.g. density of about <0.9 g/cm³). Accordingly, to sink an empty "floating" container comprising algaecide, the powderous compound must have a density greater than 1.0 g/cm³. In embodiments the powderous compound has a density of about 1.1 g/cm³ to about 5 g/cm³, or about 1.5 g/cm³ to about 3 g/cm³. In embodiments, the dissolving powderous compound is a chemical compound for treating the waters of a pool. Suitable examples include, but are not limited to, salts (e.g. NaCl, NaBr, KCl, KBr, MgCl₂), clarifiers, pH adjusters, increasers of hardness, water softeners, bicarbonate (~2.2 g/cm³), borax (~1.73 g/cm³), inert solid compounds that dissolve with time in water, and mixtures thereof. In one embodiment the dissolving powderous compound is a clarifier selected from inorganic salts, PolyDADMAC, polyamides, polyacrylamide, gamma polygluconic acid and mixtures thereof. In one embodiment the clarifier comprises aluminium sulfate (alun) @2.7 g/cm³. In one embodiment the clarifier comprises Clarita™ (Sani Marc) @1.5-2.7 g/cm³. Preferably the powderous compound takes the form of a solid tablet that is inserted inside the sub-hollow space of the container.

As it can be appreciated, in the embodiment illustrated in FIGS. 1 to 7, the container 100 and cartridge 1 have a generally frustoconical shape. However, the invention is not limited to a particular shape and it encompasses the use of many other suitable shapes including, but not limited to, a cylindrical shape, a cubic shape, a cuboidal shape, a pyramidal shape, and an hemispherical shape.

In one particular embodiment, the cartridge has A frustoconical shape with a top diameter of about 6 cm and a bottom diameter of about 10.5 cm. Such a cartridge has weight of about 125 g to about 150 g when filled (e.g. about 100 g of algaecide @0.9 g/cm³, and about 25 g of a solid tablet of clarifier @1.5-3 g/cm³) and a weight of about 12 g when empty (e.g. HDPE @0.94 g/cm³ or PP @0.94 g/cm³). Having such a frustoconical shape may be advantageous to encourage the cartridge to settle to the bottom on its upper face or side, thereby better exposing the opening(s) to the water.

Method for the Slow Release of Chemicals in Water

As it can be appreciated, the container 1 and cartridge 100 of the present invention provide new means for slowly dissolving chemicals into water and over an extended period.

Although the present invention can find many utilities, the invention finds particular applications in the maintenance of swimming pools by allowing the slow and continuous release of chemicals (e.g. algaecide) over an extended period, for instance during wintering of the pool and/or when the owner of the pool is absent. Another benefit associated with the present invention is that the user is never in contact with the chemical products.

Figure 10:
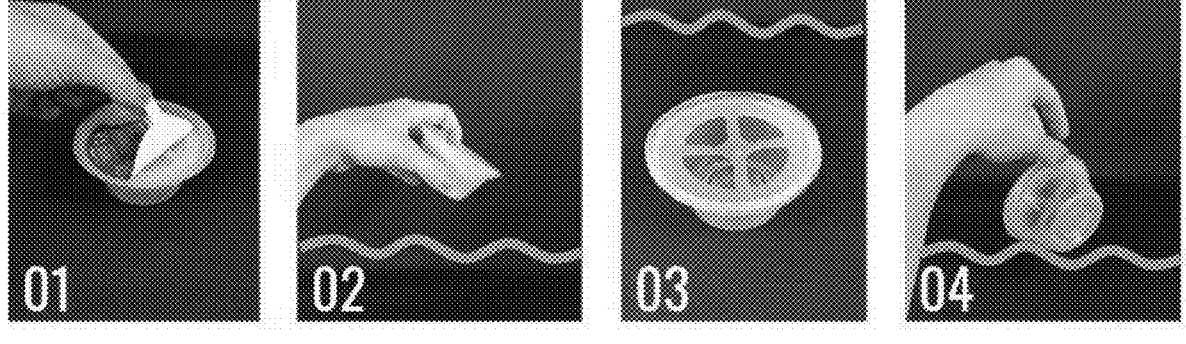
FIG. 10 is a panel of pictures illustrating a method for the slow release of algaecide in a swimming pool, in accordance with one embodiment of the invention.

FIG. 10 illustrates how one can use a cartridge in accordance with the present invention. At step 01, a user removes the self-adhesive label sealing the opening(s) of the lid. At step 02, the cartridge is dropped into the water and let to skink. At step 03, the content of the cartridge slowly dissolves into the bottom of the water. At step 04, the empty cartridge rises at the surface and the floating container is discarded or recycled by the user.

In embodiments the cartridge comprises an algaecide as described hereinbefore and such method is used for the slow release of the algaecide in a swimming pool, e.g. for wintering the pool and/or when a user does not want (or cannot) add algaecide on a regular basis. In embodiments the algaecide and the powderous material dissolve into the water for an extended period before the cartridge can float at the surface (e.g. over a period of about 2 days to about 250 days, or at least 15, 10, 25, 50, 100, 150 or 200 days).

Kit

An additional related aspect of the invention concerns a kit comprising minimally a cartridge as defined herein.

One particular aspect comprises for instance a kit for wintering a swimming pool and/or for minimal pool maintenance, the kit comprising: 1) a cartridge comprising an algaecide as defined herein; and 2) at least one of the instructions, chlorination granules, chlorination tablets, salt cell protector, stabilizer, neutralizer for ensuring a proper pH balance, water analysis product(s) (e.g. test strips, pH testers and the like), a bucket, a measuring cup, a liquid water antifreeze, etc.

Those skilled in the art will recognize, or be able to ascertain, using no more than routine experimentation, numerous equivalents to the specific procedures, embodiments, claims, and examples described herein. Such equivalents are considered to be within the scope of this invention, and covered by the claims appended hereto. The invention is further illustrated by the following example, which should not be construed as further or specifically limiting.

Methods of Manufacture

Additional related aspects of the invention concern methods of manufacturing a cartridge as defined herein. For instance, methods and techniques that could be used for manufacturing a plastic container in accordance with the invention include, but are not limited to, thermoforming, blow molding, vacuum forming, pressure forming, twin sheet forming, etc.

In one embodiment the lid and hollow housing are made by thermoforming. Briefly, a sheet of a plastic is heated over a male-type mold. Using suction and hot air the sheet is aspirated over the mold to the desired shapes. In one embodiment, the housing has a conical shape with a circular wall having an angle of about of 6 to 35 degrees, thereby facilitating demolding. Next the lid and hollow housing are cut out the sheet to obtain the desired rounded shape. Next, opening(s) are cut in the lid and a label is deposited on an outer surface of the lid to seal the opening(s) to obtain a pre-labeled lid.

For assembling of the cartridge, the dissolving powderous compound is introduced in the internal cavity of the housing. Next, hot dissolving algaecide is poured over the powderous compound into the housing. The lid comprising the label (i.e. pre-labeled lid) is next deposited over the bottom portion of the housing and the lid and housing are joined together by heat fusion (i.e. heating both pieces simultaneously and pressing them together to form a permanent bond).

EXAMPLES

Example 1: Dissolution Rates Under Warm and Cold Temperatures

Cartridges according to the invention were tested for dilution in warm (e.g. summer) or cold (e.g. winter) water temperatures. The cartridges had a frustoconical shape in accordance with FIG. 1, with a upper diameter of about 5.4 cm, a bottom diameter of about 10 cm, and a lid with four openings totaling a surface of dilution of about 12 cm². The cartridges contained about 100 g of algaecide and 25 g of g of clarifier.

Results of the dilution experiments are summarized in Tables 2 and 3 below. As expected, the dilution speed was directly dependent on the water temperature (i.e. faster dilution in warmer water). The measured dilution rates at different periods during the year confirmed that the cartridge of the present invention was able to release their chemicals slowly and continuously, and for a long period.

TABLE 2

| | | | Dilution during the summer period | | |
| --- | --- | --- | --- | --- | --- |
| | May | June | July | August | September |
| Average T ° (min/max) | 6/16 | 12/22 | 15/25 | 14/24 | 10/20 |
| Approx. water T ° (° C.) | 12 | 20 | 26 | 26 | 15 |
| Dilution rate (mg/j) | 51.573 | 160.61 | 376.53 | 376.53 | 78.96 |
| Dilution speed (mg/m) | 1598.76 | 4818.42 | 11672.52 | 11672.52 | 2368.95 |

TABLE 3

| | | | | Dilution during the winter period | | | |
| --- | --- | --- | --- | --- | --- | --- | --- |
| | October | November | December | January | February | March | April |
| Average T ° (min/max) | 4/11 | −2/5 | −3/−10 | −15/−7 | −13/−4 | −8/1 | 0/8 |
| Approx. water T ° (° C.) | 12 | 8 | 4 | 4 | 4 | 8 | 10 |
| Dilution rate (mg/j) | 51.57 | 29.22 | 16.56 | 16.56 | 16.56 | 29.224 | 38.82 |
| Dilution speed (mg/m) | 1598.76 | 876.72 | 513.36 | 513.36 | 463.68 | 905.94 | 1164.69 |

Headings are included herein for reference and to aid in locating certain sections. These headings are not intended to limit the scope of the concepts described therein, and these concepts may have applicability in other sections throughout the entire specification. Thus, the present invention is not intended to be limited to the embodiments shown herein but is to be accorded the widest scope consistent with the principles and novel features disclosed herein.

The singular forms "a", "an" and "the" include corresponding plural references unless the context clearly dictates otherwise. Thus, for example, reference to "a compound" includes one or more of such compounds and reference to "the method" includes reference to equivalent steps and methods known to those of ordinary skill in the art that could be modified or substituted for the methods described herein.

Unless otherwise indicated, all numbers expressing quantities of ingredients, reaction conditions, concentrations, properties, and so forth used in the specification and claims are to be understood as being modified in all instances by the term "about". At the very least, each numerical parameter should at least be construed in light of the number of reported significant digits and by applying ordinary rounding techniques. Accordingly, unless indicated to the contrary, the numerical parameters set forth in the present specification and attached claims are approximations that may vary depending upon the properties sought to be obtained. Notwithstanding that the numerical ranges and parameters setting forth the broad scope of the embodiments are approximations, the numerical values set forth in the specific examples are reported as precisely as possible. Any numerical value, however, inherently contains certain errors resulting from variations in experiments, testing measurements, statistical analyses and such.

It is understood that the examples and embodiments described herein are for illustrative purposes only and that various modifications or changes in light thereof will be suggested to persons skilled in the art and are to be included within the present invention and scope of the appended claims.

The invention claimed is:

1. A disposable prefilled cartridge (1) for the gradual release of an algaecide into a swimming pool, comprising:
   a single piece plastic housing (10) with a sidewall defining an interior volume, and having:
   a top portion (12) having a central hollow bump (13) extending away from the interior volume and having an annular void (15) defined between an uppermost portion of the sidewall defining a rim (17) and the central hollow bump (13), an interior portion of the central hollow bump (13) defining a sub-hollow space (14) open to the interior volume; and
   an open closeable bottom portion (11) disposed at the bottom of the sidewall;
   a lid (40) for covering the open closeable bottom portion (11) of the housing (10), wherein said lid (40) is detachably connected to the open closeable bottom portion (11) of the housing (10), or comprises at least one opening extending therethrough, for allowing a flow of liquid into the interior volume;
   a water-soluble water-treatment tablet (20) disposed within the sub-hollow space (14); and
   a water-soluble algaecide material (30) that is compositionally different from the water-soluble water treatment tablet (20) disposed within the interior volume, covering and surrounding the water-soluble water-treatment tablet (20) and the sub-hollow space (14).

2. The disposable prefilled cartridge of claim 1, wherein the lid further comprises a removable sheet for sealing the open closeable bottom portion of the housing.

3. The disposable prefilled cartridge of claim 1, wherein the water-soluble algaecide material comprises a compound selected from the group consisting of quaternary ammonium compounds, polyquaternium compounds, copper salts, zinc salts and mixtures thereof.

4. The disposable prefilled cartridge of claim 1, wherein the water-soluble water-treatment tablet comprises a compound selected from the group consisting of clarifiers, pH adjusters, increasers of hardness and mixtures thereof.

5. The disposable prefilled cartridge of claim 4, wherein the clarifier is selected from PolyDADMAC, polyamides, polyacrylamide, gamma polygluconic acid and mixtures thereof.

6. The disposable prefilled cartridge of claim 1, wherein the cartridge has a frustoconical shape.

7. The disposable prefilled cartridge of claim 1, wherein at least one of the housing and lid is made of a plastic selected from the group consisting of Low Density Polyethylene (LDPE), Medium Density Polyethylene (MDPE), High Density Polyethylene (HDPE), Polypropylene (PP), Cellulose Acetate (CA), Polyethylene Terephthalate Glycol (PETG), Polyethylene Terephthalate (PET), and Polyvinyl Chloride (PVC).

8. The disposable prefilled cartridge of claim 1, wherein at least one of the housing and lid is made of a plastic selected from the group consisting of High Density Polyethylene (HDPE) and Polypropylene (PP).

9. A method for adding algaecide to a swimming pool, comprising:

providing the disposable prefilled cartridge of 23;

dropping said disposable prefilled cartridge into the pool, wherein the prefilled cartridge sinks to the bottom of the pool when filled and floats at the surface of the pool when empty;

recovering said cartridge at the surface of the pool when empty; and discarding the empty cartridge.

10. A kit for wintering a swimming pool, comprising:

(a) the disposable prefilled cartridge of claim 1; and (b) at least one of the user instructions, chlorination granules, chlorination tablets cell protector, stabilizer, neutralizer for ensuring a proper pH balance, water analysis product(s), a bucket, and a measuring cup.

11. The disposable prefilled cartridge of claim 1, wherein said disposable prefilled cartridge provides for release of the water-soluble algaecide material as a first step and release of the water-soluble water-treatment tablet as a subsequent step, when the cartridge is dropped in water.

12. A disposable prefilled frustoconically shaped cartridge (1) for the gradual release of an algaecide into a swimming pool, comprising:

a single piece, frustoconically shaped, plastic housing (10) with a frustoconically shaped sidewall defining an interior volume, and having:

a top portion (12) having a central hollow bump (13) extending away from the interior volume and having an annular void (15) defined between an uppermost portion of the frustoconically shaped sidewall defining a rim (17) and the central hollow bump (13), an interior portion of the central hollow bump (13) defining a sub-hollow space (14) open to the interior volume; and an open closeable bottom portion (11) disposed at the bottom of the frustoconically shaped sidewall;

a lid (40) for covering the open closeable bottom portion (11) of the housing (10), wherein said lid (40) is detachably connected to the open closeable bottom portion (11) of the housing (10), or comprises at least one opening extending therethrough, for allowing a flow of liquid into the interior volume;

a water-soluble water-treatment tablet (20) disposed within the sub-hollow space (14); and a water-soluble algaecide material (30) that is compositionally different from the water-soluble water treatment tablet (20) disposed within the interior volume, covering and surrounding the water-soluble water-treatment tablet (20) and the sub-hollow space (14).

\* \* \* \* \*